US008383761B2

(12) United States Patent
Beaujuge et al.

(10) Patent No.: US 8,383,761 B2
(45) Date of Patent: *Feb. 26, 2013

(54) GREEN TO TRANSMISSIVE SOLUBLE ELECTROCHROMIC POLYMERS

(75) Inventors: Pierre Marc Beaujuge, Gainesville, FL (US); John R. Reynolds, Gainesville, FL (US); Stefan Martin Ellinger, Visp (CH)

(73) Assignee: University of Florida Research Foundation, Inc., Gainesville, FL (US)

( * ) Notice: Subject to any disclaimer, the term of this patent is extended or adjusted under 35 U.S.C. 154(b) by 18 days.

This patent is subject to a terminal disclaimer.

(21) Appl. No.: 12/740,570

(22) PCT Filed: Oct. 29, 2008

(86) PCT No.: PCT/US2008/081599
§ 371 (c)(1),
(2), (4) Date: Jul. 15, 2010

(87) PCT Pub. No.: WO2009/058877
PCT Pub. Date: May 7, 2009

(65) Prior Publication Data
US 2010/0298527 A1 Nov. 25, 2010

Related U.S. Application Data

(60) Provisional application No. 61/000,908, filed on Oct. 30, 2007.

(51) Int. Cl.
*C08G 75/00* (2006.01)
(52) U.S. Cl. .................. 528/377; 528/370; 528/380
(58) Field of Classification Search .............. 528/380, 528/377, 370
See application file for complete search history.

(56) References Cited

U.S. PATENT DOCUMENTS

| 6,791,738 B2 | 9/2004 | Reynolds et al. |
| 2005/0200935 A1 | 9/2005 | Liu et al. |

FOREIGN PATENT DOCUMENTS

| JP | 2005255591 | * 9/2005 |
| WO | WO 03-046106 | 6/2003 |
| WO | WO 2007-087587 | 8/2007 |

OTHER PUBLICATIONS

Thompson et al., JACS, 2006, 128,12714-12725.*
Shin et al., J. of Poly. Sci.: A, 45, 1394-1402, 2007.*
Casado, J. et al., "Alternated Quinoid/Aromatic Units in Terthiopheses Building Blocks for Electroactive Narrow Band Gap Polymers. Extended Spectroscopic, Solid State, Electrochemical, and Theoretical Study," *Journal of Physical Chemistry B*, Aug. 17, 2005, pp. 11616-16627, vol. 109, No. 35.
Durmus, A, et al., "A neutral state of green polymer with a superior transmissive light blue oxidized state," *Chemical Communications*, May 15, 2007, pp. 3246-3248.
Mortimer, R.J. et al., "Electrochromic organic and polymeric materials for display applications," *Displays Devices*, 2006, pp. 2-18, vol. 27, No. 1.

(Continued)

*Primary Examiner* — Shane Fang
(74) *Attorney, Agent, or Firm* — Saliwanchik, Lloyd & Eisenschenk

(57) ABSTRACT

Green to transmissive soluble electrochromic polymers are conjugated polymers having a plurality of repeating units where repeating units are a plurality of substituted dioxyheterocycle based donor groups coupled to an acceptor group. The conjugated polymer absorbs radiation within a first band of the visible spectrum and a second band of the visible spectrum when in a neutral state resulting in a green color and is transmissive when in an oxidized state. The polymers are soluble allowing processing of films and coatings from solution.

25 Claims, 5 Drawing Sheets

OTHER PUBLICATIONS

Pai, C-L. et al., "Electronic structure and properties of alternating donor-acceptor conjugated copolymers: 3,4-Ethylenedioxythiophene (EDOT) copolymers and model compounds," *Polymer*, 2006, pp. 699-708, vol. 47, No. 2.

Reeves, B.D. et al., "Spray Coatable Electrochromic Dioxythiophene Polymers with High Coloration Efficiencies," *Macromolecules*, 2004, pp. 7559-7569, vol. 37, No. 20.

Reeves, B.D. et al.,"Defunctionalization of Ester-Substituted Electrochromic Dioxythiophene Polymers," *Macromolecules*, 2007, pp. 5344-5352, vol. 40.

Shin, W.S. et al., Synthesis and Photovoltaic Properties of a Low-Band-Gap Polymer Consisting of Alternating Thiophene and Benzothiadiazole Derivatives for Bulk-Heterojunction and Dye-Sensitized Solar Cells, *Journal of Polymer Science: Part A: Polymer Chemistry*, 2007, pp. 1394-1402, vol. 45, No. 8.

Van Mullekom, H.A.M. et al., "Developments in the chemistry and band gap engineering of donor-acceptor substituted conjugated polymers," *Materials Science and Engineering*, 2001, pp. 1-40, vol. 32, No. 1.

Nagarjuna, G. et al., "A straightforward route to electron transporting conjugated polymers," *J. Mater. Chem.*, 2002, pp. 16091-16094, vol. 22.

Sim, J.H. et al., "Preparation of 3,4-Ethylenedioxythiophene (EDOT) and N-4-butylphenyl-N,N-diphenylamine (BTPA) Copolymer Having Hole Transport Ability," *Macromolecular Research*, 2009, pp. 714-717, vol. 17, No. 9.

* cited by examiner

GREEN TO TRANSMISSIVE SOLUBLE ELECTROCHROMIC POLYMERS

CROSS-REFERENCE TO RELATED APPLICATION

This application is the U.S. national stage application of International Patent Application No. PCT/US2008/081599, filed Oct. 29, 2008, which claims the benefit of U.S. Provisional Application Ser. No, 61/000,908, filed Oct. 30, 2007, the disclosures of which are hereby incorporated by reference in their entireties, including any figures, tables, or drawings.

The subject invention was made with government support under the Air Force Office of Scientific Research, Contract No. F9550-06-1-0192. The government has certain rights to this invention.

BACKGROUND OF THE INVENTION

Polymeric electrochromics capable of a fast and reversible color change upon electrochemical oxidation and reduction have received a considerable attention over the past decade. A particular emphasis has been placed on incorporating the most stable of these electroactive materials in devices such as windows, mirrors (rear-view/side-view mirrors for cars) and displays, for anticipated industrial and commercial applications. While a number of neutral state red and blue absorbing conjugated polymers have been synthesized and integrated into electrochromic devices, attempts at synthesizing saturated green polymers chemically or electrochemically, which can switch to a transmissive state, have met with limited success due to the complex nature of the required absorption spectrum that must contain at least two bands in the neutral state of the material.

To date, only one article reports the existence of a green conjugated polymer with a transmissive state (with a blue hue) upon oxidation. (Durmus et al., *Chem. Commun.*, 2007, 3246-3248). However, this material is prepared by an electrochemical polymerization/film deposition and does not show any solubility/processability making it difficult to be integrated into devices, restricting the scope of possible applications. Accordingly, soluble neutral state green conjugated polymers with high electrochromic contrasts, fast switching times and highly transmissive oxidized states would be a desirable improvement in the field of conjugated polymers. Additionally, materials that are solution processable would provide advantages in a wide range of applications.

BRIEF SUMMARY OF THE INVENTION

Embodiments of the invention are directed to a conjugated polymer constructed with a plurality of repeating units where the repeating units have a plurality of substituted dioxyheterocycle based donor groups coupled to an acceptor group. The conjugated polymer absorbs radiation within a first band of the visible spectrum and a second band of the visible spectrum when in a neutral state but is transmissive in these bands in an oxidized state. The absorbance of radiation within the first and second bands in the oxidized state is less than in the neutral state to the extent, often by 200% or more, such that one can discern the polymer as colored in the neutral state but of little or no color in the oxidized state. The first absorption band can have a visible absorption maximum at a wavelength below about 500 nm and the second absorption band can have a visible absorption maximum at a wavelength above about 550 nm and a local minimum between 480 and 580 such that the neutral state colored polymer is green in appearance.

The polymer can be soluble in one or more solvents, for example methylene chloride, chloroform, tetrachloroethane, tetrahydrofuran, dioxane, benzene, toluene, xylenes, chlorobenzene, dichlorobenzene, pyridine, ethyl acetate, butanol, ethanol, methanol, acetonitrile, acetone, isopropanol, water and mixtures thereof. The polymer can then be prepared and processed into films or coatings from solution. The dioxyheterocycle of the polymer can be a dioxythiophene, such as an alkylenedioxythiophene, for example a 3,4-propylenedioxythiophene. The acceptor group is an electron poor aromatic unit such as a substituted or unsubstituted benzothiadiazole group, thiadiazoloquinoxaline group, quinoxaline group, thienothiadiazole group, thienopyrazine group, pyrazinoquinoxaline group, benzobisthiadiazole group or thiadiazolothienpyrazine group.

In many embodiments the conjugated polymer can be envisioned by the repeating unit is a sequence of structural formula III:

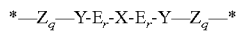

$$*-Z_q-Y-E_r-X-E_r-Y-Z_q-* \qquad \text{III}$$

where X is an electron poor aromatic unit, E is an electron rich conjugated unit, Y is a substituted dioxyheterocycle, Z is a conjugated unit, and q and r are 0, 1, 2 or 3. The unit Y can be a substituted dioxythiophene that can be an alkylenedioxythiophene substituted with at least one linear or branched aliphatic carbon chain that can have one or more heteroatoms within the chain as indicated by the propylenedioxythiophene (ProDOT) in formula II:

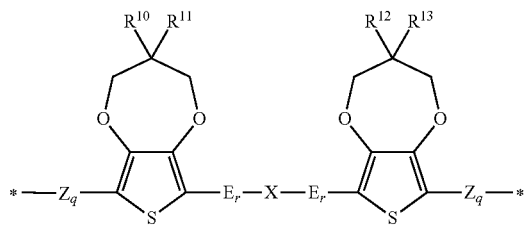

where X is an electron poor aromatic unit, E is an electron rich conjugated unit, Z is a conjugated unit, q and r are 0, 1, 2 or 3, and $R^{10}$, $R^{11}$, $R^{12}$ and $R^{13}$ are the same or different and at least one of $R^{10}$, $R^{11}$, $R^{12}$ and $R^{13}$ includes a linear or branched aliphatic carbon chain that optionally includes one or more heteroatoms. The electron poor aromatic unit, X, can be a substituted or unsubstituted benzothiadiazole group, thiadiazoloquinoxaline group, quinoxaline group, thienothiadiazol group; thienopyrazine group, pyrazinoquinoxaline group, benzobisthiadiazole group or thiadiazolothienopyrazine group. For example, in embodiments of the invention the electron poor aromatic unit can be a 2,1,3-benzothiadiazole group (BTD). The electron rich conjugated unit E can be a substituted or unsubstituted thiophene and Z can be a substituted or unsubstituted dioxythiophene group.

Another embodiment of the invention involves a method of forming a conjugated polymer, which includes steps of reacting two donor compounds having a substituted dioxyheterocyclic moiety with a conjugated acceptor compound having an acceptor moiety to form a polymerizable unit, which is an oligomer where dioxyheterocycle based donor groups are attached to an acceptor group. A plurality of these oligomeric polymerizable units can then be linked covalently to form the conjugated polymer, where the conjugated polymer absorbs radiation within a first band of the visible spectrum and a second band of the visible spectrum when in a neutral state and upon oxidation the polymer is transmissive as described above. The polymer is soluble in at least one solvent. In one embodiment the dioxyheterocyclic moiety can be a dioxythiophene moiety having a coupling moiety which can be an organometallic substituent such as an organotin substituent, organoboron substituent, organomagnesium substituent, organozinc substituent, or organosilane substituent and the conjugated acceptor compound contains a pair of complementary halogen functional groups symmetrically situated on the conjugated acceptor compound. Conversely, in another embodiment, a pair of organometallic substituents can be attached to the conjugated acceptor compound and a halogen group can be the coupling moiety of the dioxyheterocyclic moiety.

DETAILED DESCRIPTION OF THE INVENTION

Figure 1A:
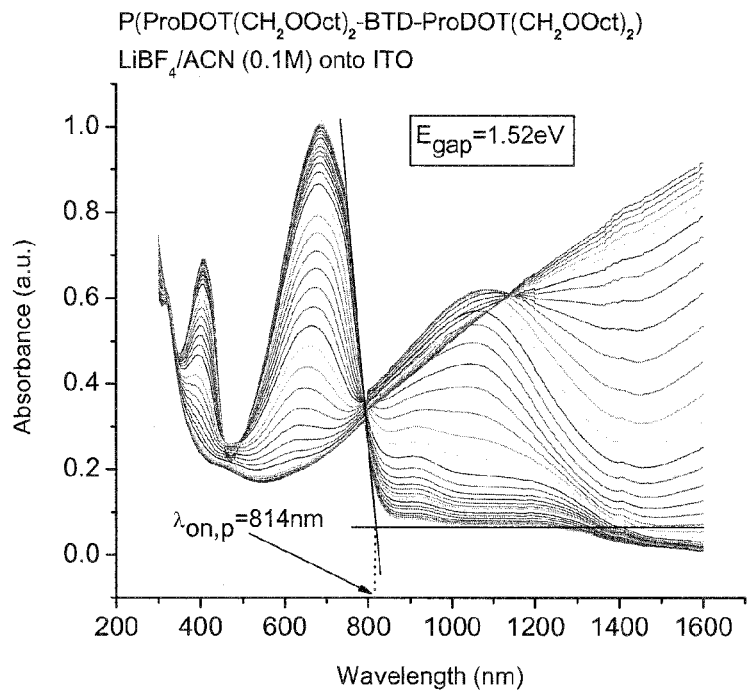
FIG. 1 shows absorbance spectra of polymers (a) 6a, (b) 6b, (c) 9 and (d) 12 respectively where thin films were cast onto ITO from toluene (6a, 6b, 9) or chloroform (12) and electrochemically oxidized in a 0.1 M solution of $LiBF_4$ in Acetonitrile.
Figure 1B:
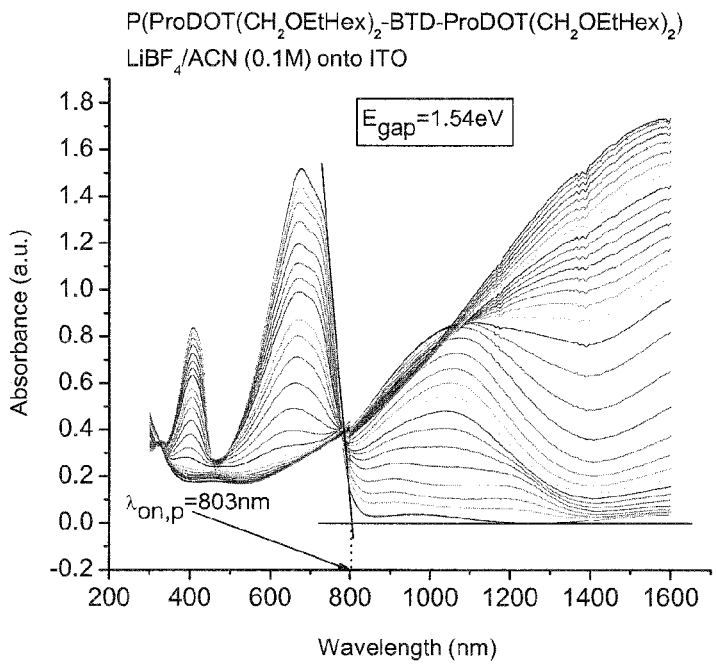
Figure 1C:
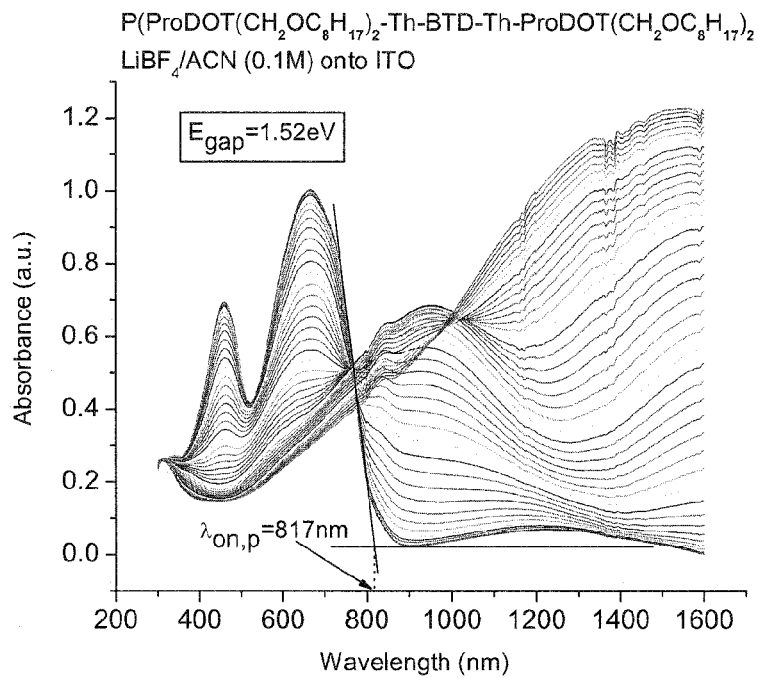
Figure 1D:
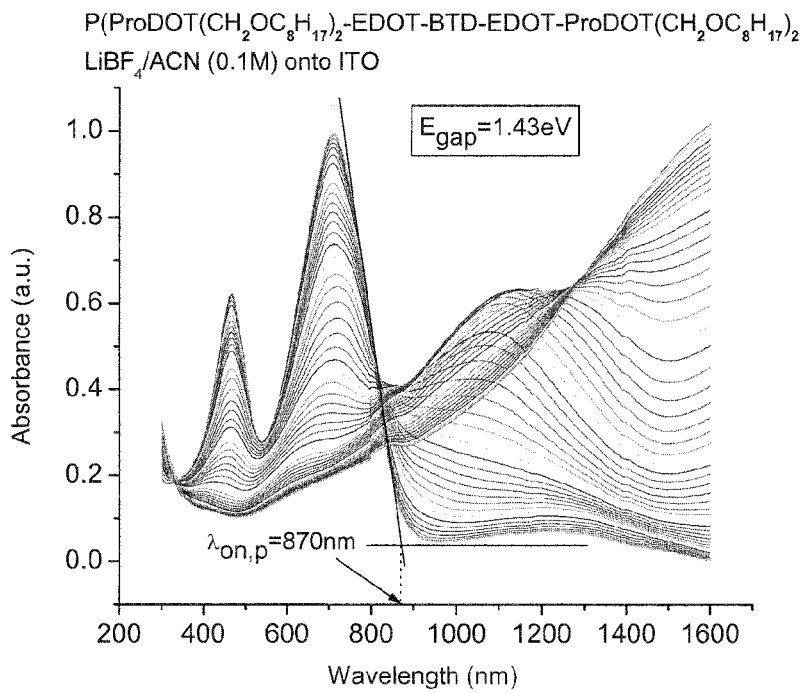

One embodiment of the invention is a new and efficient route towards synthesizing novel, soluble conjugated polymers that are green in the neutral state and high transmissive in the oxidized state. According to an embodiment of the invention, the soluble conjugated polymer provides one or more of the following advantages: high optical contrast in the visible region; outstanding electrochemical switching properties; charge transport properties, as desired for green colored solar cells; and the ability to be processed into electrochromic devices using convenient deposition methods, such as spin coating, roll-to-roll coating, spray casting, and various methods of printing (e.g. ink jet printing).

To achieve a neutral state green polymer, absorbption in the red and the blue regions of the visible spectrum is required. Fine tuning of the energy gap, as well as introduction of an adequate set of absorption bands in the electromagnetic spectrum, is achieved by the choice of the structure of the repeating units that compose the conjugated portion of the polymer. Structural parameters are controlled to achieve the desired optical properties and processability for this new family of soluble polymers. Careful analysis and comparison of the bathochromic shift occurring upon polymerization can allow determination of an expected absorption spectrum of a single polymerizable unit to be synthesized and polymerized. This polymerizable unit comprises electron donating and accepting moieties that constitute the backbone of the electrochromic polymer.

In embodiments of the invention, a dioxythiophenes moieties having at least one solubilizing chain substituted thereon comprise the donating moieties within the polymerizable units employed to form the polymers. Any solubilizing chains can be employed that provide a desired solubility during processing. In one embodiment, the solubilizing chains can be alkoxy solubilizing chains (linear or branched), which allow processing into solid thin film by solution casting and can enhance transmissivity of the oxidized state. For a polymeric material transmitting/reflecting green light, obtaining highly transmissive contrasts upon oxidation requires simultaneous and efficient bleaching of the two absorption bands that occur in the blue and red portions of the visible spectrum.

The soluble conjugated polymers of embodiments of the invention are prepared by coupling dioxyheterocyclic donor moieties with acceptor moieties via coupling reactions. Coupling reactions that can be used, include, but are not restricted to: Stille coupling, Kumada coupling, Hiyama coupling, Negishi coupling and Suzuki coupling.

In one embodiment of the invention Stille coupling is employed as the coupling reaction. In this embodiment, the polymerizable units are prepared using stannylated dioxythiophenes, which can be prepared using any suitable technique, followed by an oxidative polymerization of the units. The units are appropriately functionalized oligomers of donor and acceptor moieties that in combination yield the electrochromic properties of the green to transmissive polymers. In an embodiment, the stanylated dioxythiophene compounds can be 3,4-propylenedioxythiophenes compounds of formula 3 in Scheme 1, below, shown as trimethyl tin (—SnMe3), or any suitable organotin substituent, such as triethyl tin (—$SnEt_3$) or tributyl tin (—$SnBu_3$). The organotin substituent can be replace with any suitable substituent, such as an organoboron, organomagnesium, organozinc, or organosilane substituent. The R groups of formula 3 can be the same or different and can be chosen to be a linear or branched aliphatic carbon chain, or a carbon chain containing aromatic moieties, wherein the aliphatic or aromatic carbon chain can optionally comprise one or more heteroatoms (e.g., oxygen or nitrogen atoms) or functional groups chosen from oligoether groups, ester groups, amide groups, carboxylic acid groups, sulfonate groups, amine groups and other polar functional groups. The entire $CH_2OR$ group can be replaced with an alkyl or aryl chain and one of the $CH_2OR$ groups can be replaced with a hydrogen substituent. A general formula for a stanylated 3,4-propylenedioxythiophene is given in Formula I:

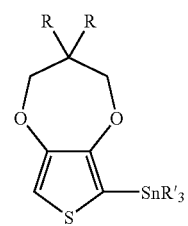

I where R groups are the same or different and comprise linear or branched aliphatic carbon chains and can optionally comprise one or more functional groups chosen from oligoether groups, ester groups, amide groups, carboxylic acid groups, sulfonate groups, amine groups and other polar functional groups and R' comprises an alkyl group.

Scheme 1

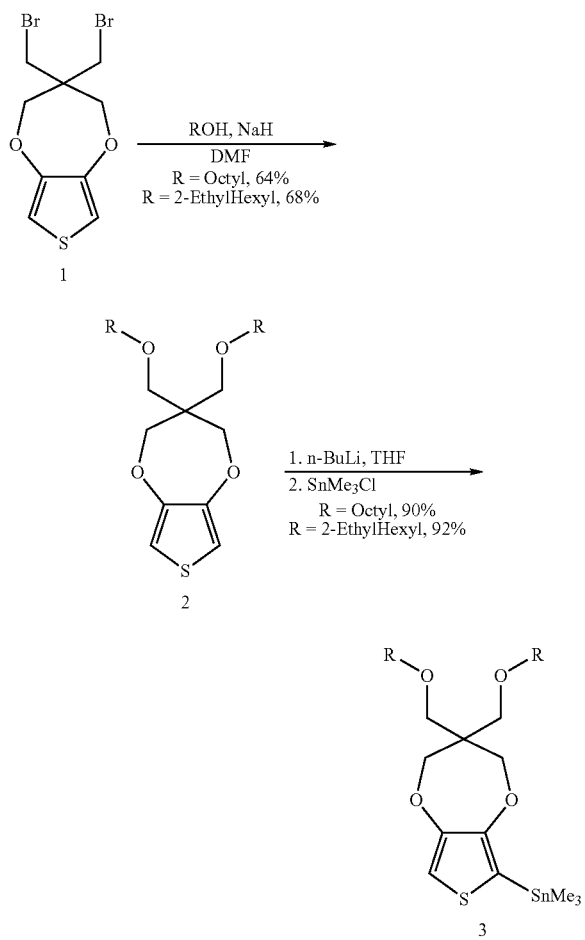

An embodiment of the invention includes preparing stannylated alkylenedioxythiophenes, as shown in Scheme 1, above, where a monostannylated bis-alkoxymethyl substituted 3,4-propylenedioxythiophene (3), which can be coupled into a polymerizable unit. The synthesis begins with a facile nucleophilic substitution of alkoxy derivatives (solubilizing group) for Br of compound 1, which is shown as a Williamson etherification in N,N-dimethylformiamide (DMF) where a sodium alkoxide is formed by the reaction of an alcohol with sodium hydride to form compound 2. The R groups of scheme 1 are shown as being octyl or 2-ethylhexyl, although any suitable linear or branched alkyl groups, such as C2 to C30 alkyl groups, can be employed. Appropriate reaction conditions for etherification reactions are known to those skilled in the art. Other reactions can be employed to form appropriately substituted 3,4-propylenedioxythiophenes for use as donor moieties to form the polymerizable units.

The resulting symmetrical alkoxy substituted compound 2 of Scheme 1 is monolithiated using a suitable organolithium reagent, such as, for example, n-butyllithium, t-butyllithium, or methyllithium. Other sufficiently basic reagents can be employed for the preparation of an organometallic intermediate, where the metal can be, for example, any alkali or earth alkali metal, for the preparation of the monostannylated product 3. The reaction can be performed in any suitable organic solvent, generally a polar aprotic solvent such as tetrahydrofuran (THF). The resulting compound is then monostannylated by replacing the resulting lithium substituent with an organotin substituent using any suitable tin containing reagent, such as trimethyltin chloride or tributyltin chloride, to afford the relatively air-stable compound 3 in high yield. Other stannylated alkylenedioxythiophenes or dioxythiophenes can be prepared in an analogous fashion to that illustrated in Scheme 1 by employing the appropriate starting compound. Although an etherification reaction is not necessary for many embodiments of the reaction, appropriate groups to achieve solubility are needed. The donor moiety used in the coupling reaction does not necessarily require the presence of a substituent to impart solubility; however, at least one moiety in the polymerizable unit has a substituent to impart solubility to the polymer.

The stanylated alkylenedioxythiophenes can then be used to form oligomers having alkylenedioxythiophene end groups, which are the polymerizable units. This process includes mixing the stanylated alkylene dioxythiophenes with an additional compound, which contains at least one acceptor moiety. For example, in an embodiment, compound 3 can react with one or more halogenated compounds containing the acceptor moiety.

Scheme 2 illustrates an example of a method according to an embodiment of the invention that progresses through the construction of soluble and symmetric conjugated oligomers, polymerizable units, having donor and acceptor moieties and through the polymerization of the oligomers to yield linear conjugated polymers. Table 1 discloses the characterization of a number of polymers according to embodiments of the invention. As illustrated in Scheme 2, a Stille reaction can be used to couple stannylated compound 3 with dibrominated acceptor containing species 4, 7 or 10. Other halogens, such as chlorine, iodine, or even fluorine can be used in place of the bromine on the acceptor compounds. The acceptors are generally, but not necessarily, symmetrically halogenated where halogens are positioned on equivalent opposite sites of the acceptor compounds, as shown for compounds 4, 7 and 10. Stille reaction processes are well known in the art, and can be carried out using, for example, a Palladium (0) or Palladium (II) catalyst. In many embodiments, the reaction is carried out under air and moisture-free conditions to maximize the reaction yields. Soluble oligomers 5, 8 and 11 can be isolated by various techniques, including, for example, column chromatography using silica as the stationary phase and varying the ratios of solvents employed for elution. Such solvents can include, for example, mixtures of hexanes, dichloromethane and ethyl acetate.

The oligomers can be polymerized in a step-growth fashion where the alkylenedioxythiophene end groups self-condense to form the conjugated polymer. For example, as illustrated in Scheme 2, the target oligomers 5, 8 and 11 can be self-condensed in chloroform, or other suitable solvent, through the low oxidation potential 3,4-propylenedioxythiophene chain-ends using ferric chloride as an efficient oxidative agent to afford fully conjugated and well-defined electroactive polymers 6a, 6b, 9 and 12 as indicated in Table 1. Polymer purification can be carried out by precipitation in MeOH, reduction in chloroform using hydrazine monohydrate followed by a 48 hours Soxhlet purification. (see Table 1) Although the "R" groups of scheme 2 are shown as being octyl or 2-ethylhexyl, any suitable linear or branched alkyl groups, such as C2 to C30 alkyl groups, can be employed to enhance processability, fine tune the color, including the hue and saturation of the green color, enhance transmissivity of the oxidized form, and modify the solid film's morphology.

Scheme 2
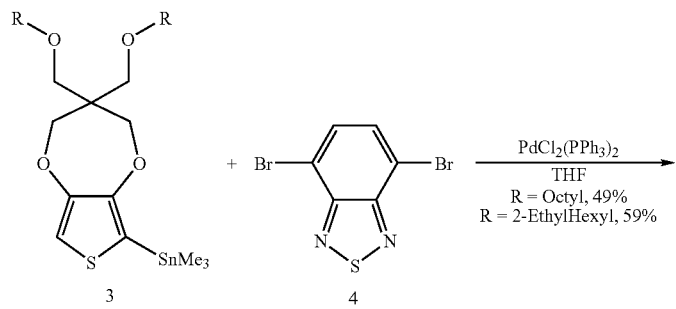
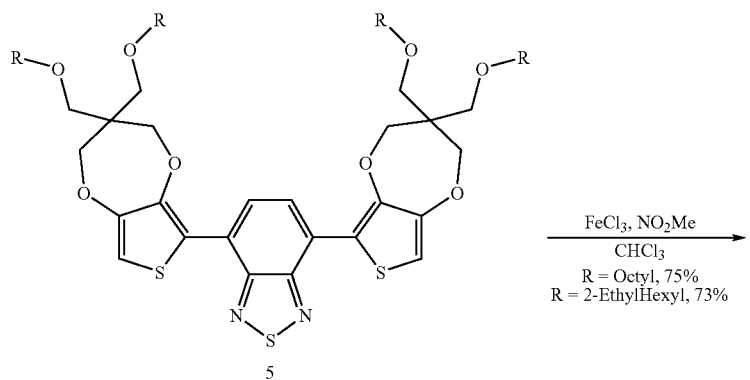
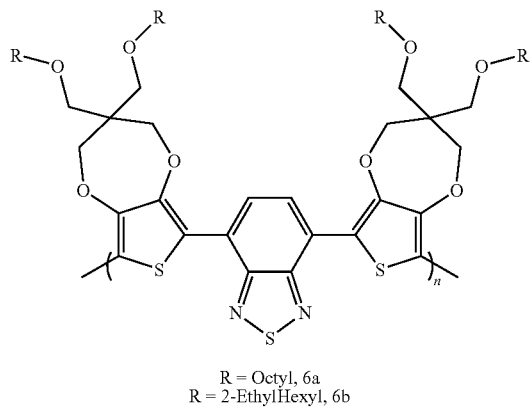
R = Octyl, 6a
R = 2-EthylHexyl, 6b
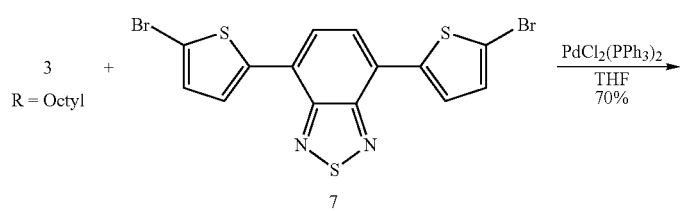

-continued
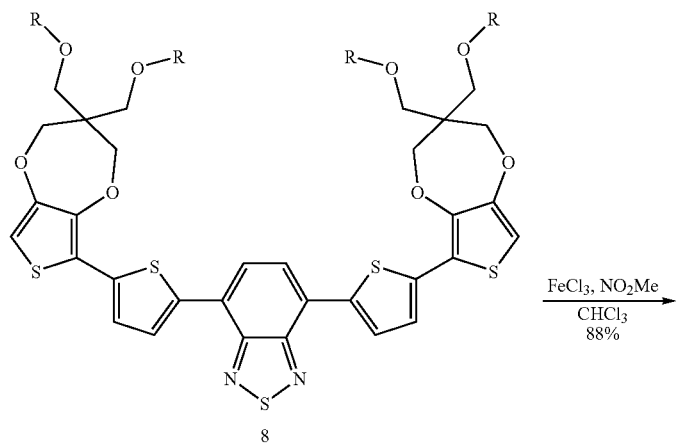
8
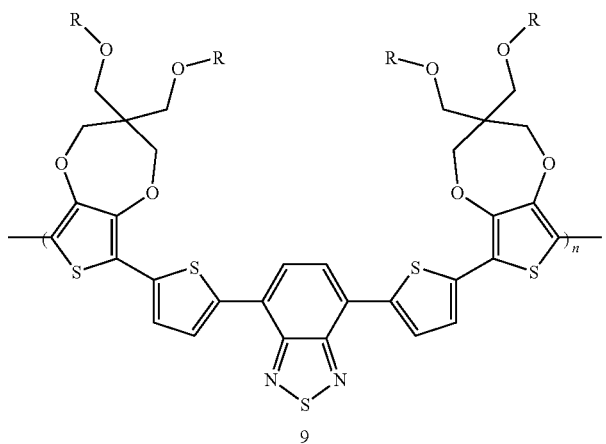
9
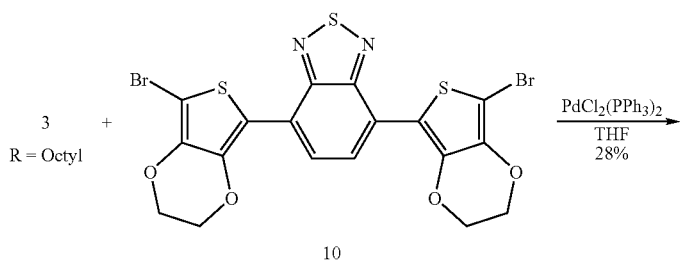
10
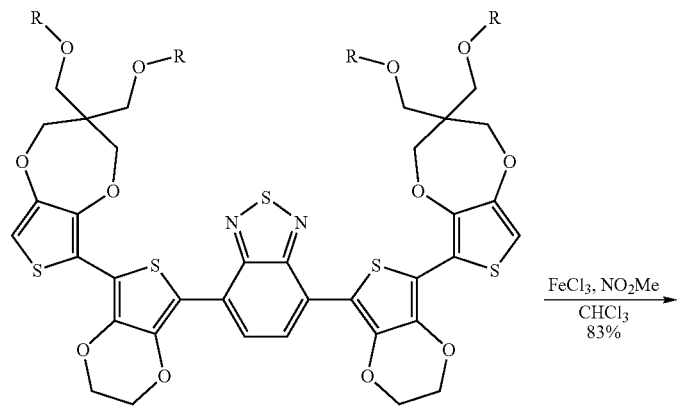
11

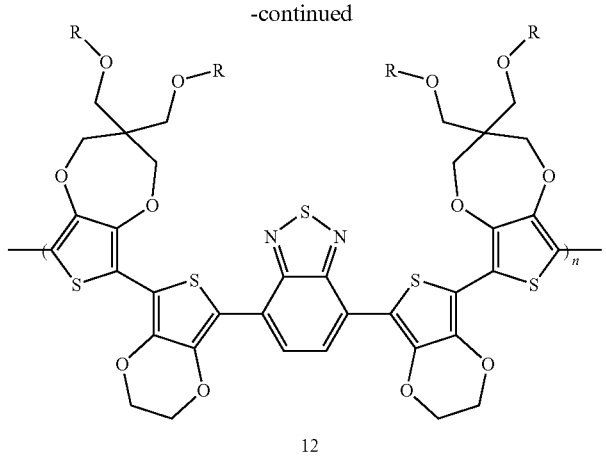

12

TABLE 1

GPC Estimated Molecular Weights in THF, Isolated Yields for the Polymerizations, Elemental Analysis of the Copolymers 6a (P([ProDOT-OOct$_2$]$_2$-BTD)), 6b (P([ProDOT-OEtHex$_2$]$_2$-BTD)), 9 (P([ProDOT-OOct$_2$-Th]$_2$-BTD)) and 12 (P([ProDOT-OOct$_2$-EDOT]$_2$-BTD)).

| Polymer | $M_n$ (g/mol) | $M_w$ (g/mol) | PDI | Avg. no. of repeat units | Avg. no. of rings | Yield (%) | EA (Calcd/Found) C | H | N |
|---|---|---|---|---|---|---|---|---|---|
| P([ProDOT-OOct$_2$]$_2$-BTD) | 14700 | 32150 | 2.2 | 15 | 45 | 75 | 66.5/66.42 | 8.57/8.64 | 2.77/2.79 |
| P([ProDOT-OEtHex$_2$]$_2$-BTD) | 27800 | 59000 | 2.1 | 27 | 81 | 73 | 66.5/66.21 | 8.57/8.48 | 2.77/2.73 |
| P([ProDOT-OOct$_2$-Th]$_2$-BTD) | 18900 | 60300 | 3.2 | 16 | 80 | 88 | 65.38/66.08 | 7.72/7.75 | 2.38/2.21 |
| P([ProDOT-OOct$_2$-EDOT]$_2$-BTD) | 10300 | 17800 | 1.7 | 8 | 40 | 83 | 63.22/62.88 | 7.33/7.27 | 2.17/2.28 |

Schemes 3, 4 and 5 illustrate other embodiments of the invention for preparing neutral state green polymers with transmissive oxidized states using the efficient synthetic strategy illustrated in Scheme 2. Scheme 3 shows the synthesis of a series of trimers differing by the nature of the acceptor core incorporated to the polymerizable unit. As illustrated in Scheme 3, other acceptor units that may be used rather than or in addition to the dibrominated 2,1,3-benzothiadiazole, 4, (Scheme 2) with a thiadiazoloquinoxaline derivative (A), a quinoxaline derivative (B) or a thienothiadiazol (C), for example. Other acceptor units that can be used in embodiments of the invention include thienopyrazine derivatives, pyrazinoquinoxaline derivatives, benzobisthiadiazoles and thiadiazolothienopyrazines.

Scheme 3

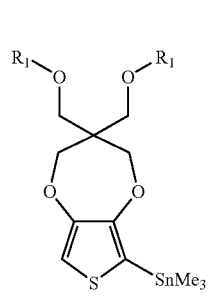

+

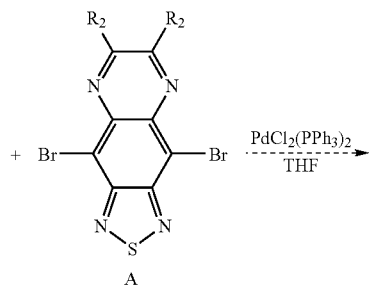

-continued

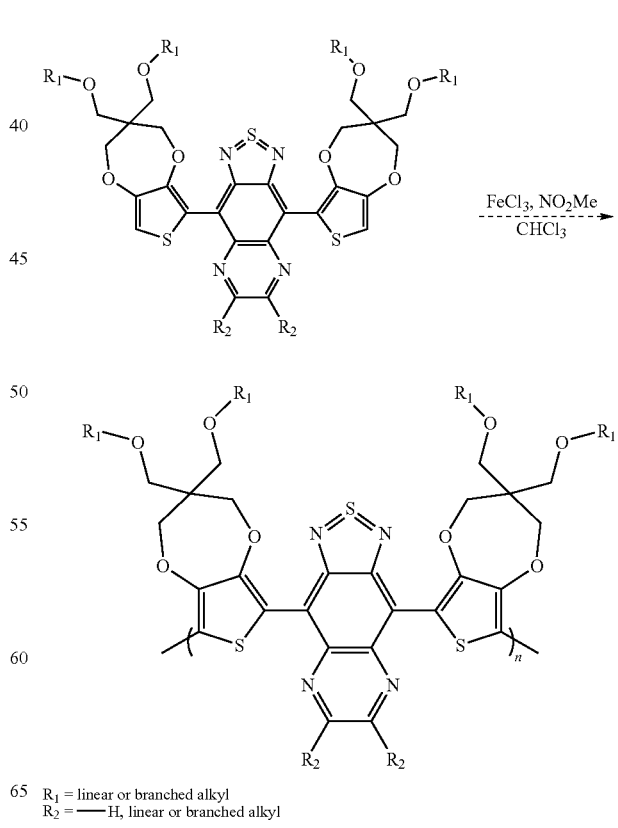

$R_1$ = linear or branched alkyl
$R_2$ = —H, linear or branched alkyl

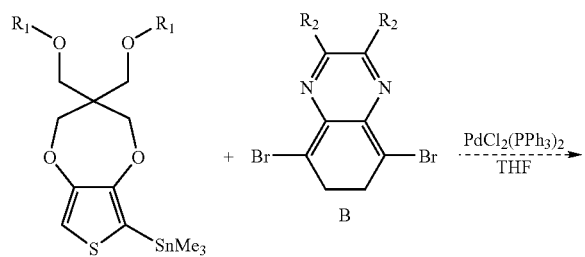

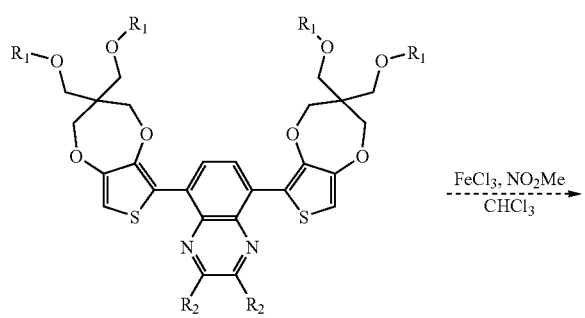

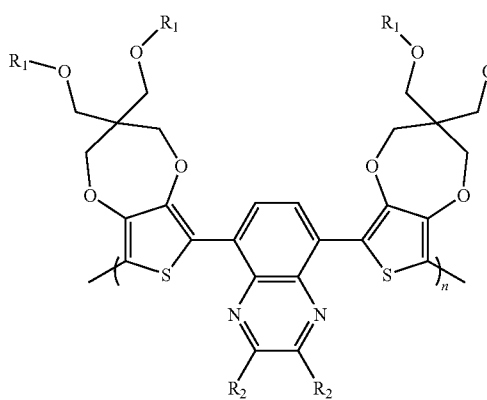

R₁ = linear or branched alkyl
R₂ = ―H, linear or branched alkyl

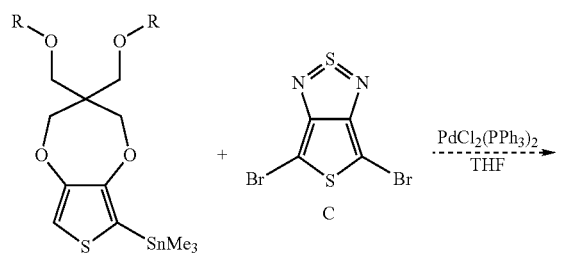

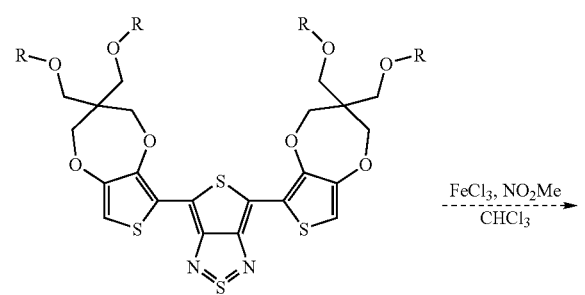

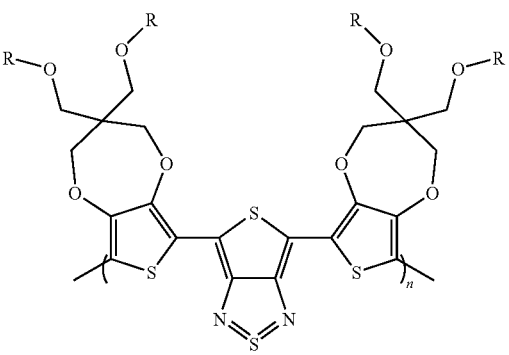

R = linear or branched alkyl

Scheme 4 shows other polymers according to embodiments of the invention where the acceptor core is part of a pentameric polymerizable unit. These pentameric polymerizable units can be oxidatively polymerized using the conditions of Scheme 2.

Scheme 4

X = A, B or C
R = linear or branched alkyl

-continued

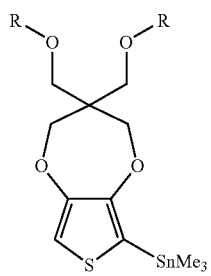

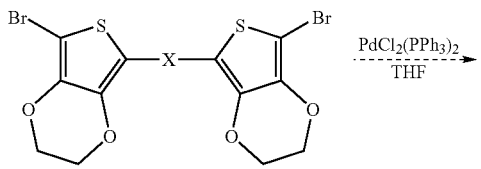

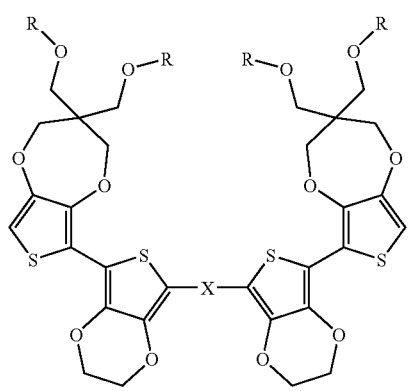

X = A, B or C
R = linear or branched alkyl

Scheme 5 illustrates an embodiment of the invention that involves reacting 3,4 propylenedioxythiophene compounds with halogenated compound that includes the acceptor moiety, in the manner described above where A, B, and C are displayed in Scheme 3, to produce an oligomer that is subsequently halogenated to form an intermediate to prepare a polymerizable unit. A second alkylenedioxythiophene compound is reacted with the halogenated intermediate to form an oligomeric polymerizable unit, which can be coupled to form the conjugated polymer. The second alkylenedioxythiophene compound can be, for example, an ethylenedioxythiopene or a propylenedioxythiophene that has been stannylated for reaction with the halogenated oligomers, as shown in Scheme 5. In addition to the alkylenedioxythiophenes illustrated in Scheme 5, other dioxyheterocycles can also be employed, for example, 3,4-alkylenedioxypyrroles, 3,4-alkylenedioxyfurans, and 3,4-alkylenedioxyselenophenes. Suitable examples of dioxyheterocycles that can be employed are disclosed in Reynolds et al. U.S. Pat. No. 6,791,738, Sep. 14, 2004.

Scheme 5

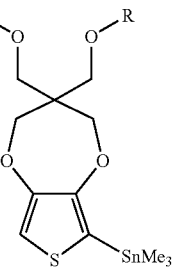

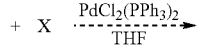

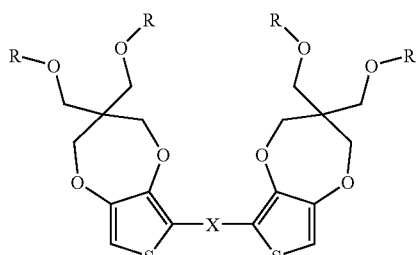

X = 4, A, B or C
R = linear or branched alkyl

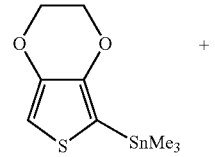

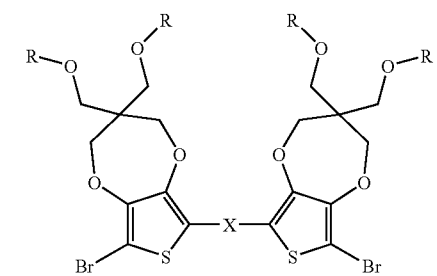

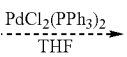

-continued

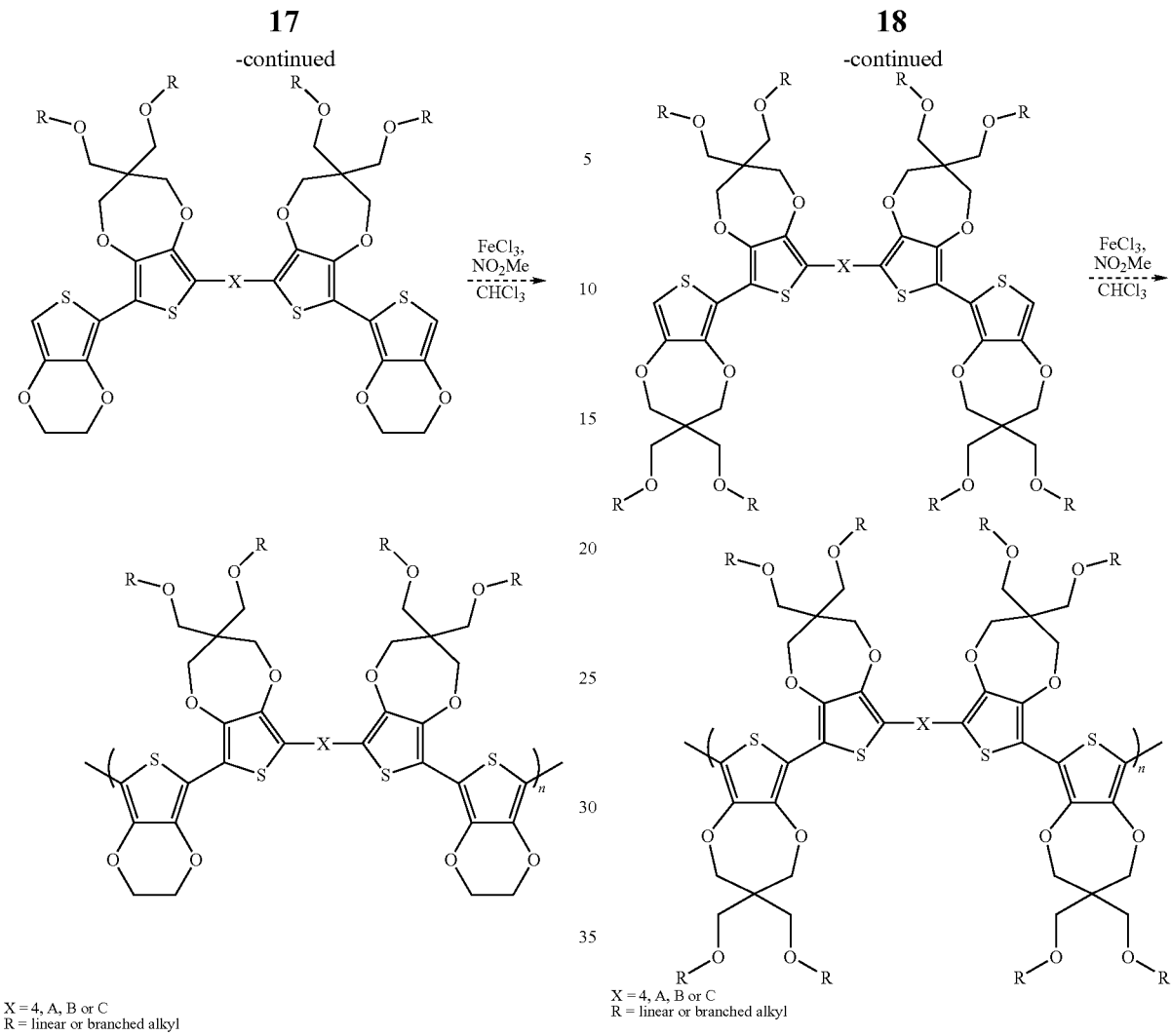

X = 4, A, B or C
R = linear or branched alkyl

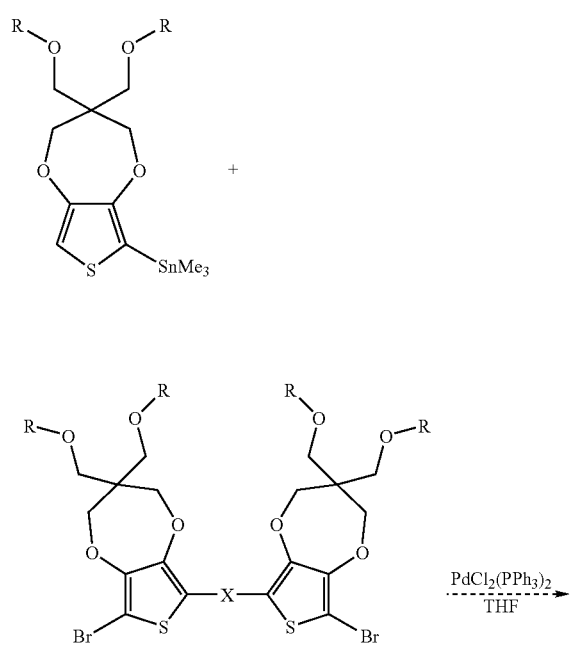

The chemistry outlined in Schemes 1-5 illustrate how the optical properties can be controlled by the nature of the conjugated backbone by varying the thiophene-based donors and the acceptors. Although the polymers illustrated above have linear and branched alkyl groups as substituents to provide organic solvent solubility and processability, in other embodiments polar or ionic side chains can be employed. For example, any of the R, $R^1$ and/or $R^2$ groups of the compounds shown in Schemes 1-5 can include oligoether, ester, amide, carboxylic acid, sulfonate, amine, phosphonic acid and other polar functionalities. Compounds including such R, $R^1$ and $R^2$ groups can be made using the proposed chemistry or modified chemistry, as would be readily understood by one of ordinary skill in the art. Ionic or highly polar pendant groups can provide solubility and processability in water or polar solvents which can permit electrochromic switching in water based electrolytes and can allow polymers to be adsorbed onto oxide surfaces of electrochromism and titania based solar cells (Graetzel Cells).

In another embodiment of the invention, ester functionalized PProDOTs can be used as the donors where after processing into films the ester can be hydrolyzed or otherwise converted to alcohols and carboxylic acids, or their derivatives, which allows for the conversion of the soluble films according to embodiments of the invention to insoluble films, as is disclosed in Reynolds et al., Published International Application WO/2007/087587, Aug. 2, 2007, incorporated herein by reference in its entirety, and Reeves et al., *Macromolecules* 2007, 40, 5344, incorporated herein by reference in its entirety. In this manner, insoluble green to transmissive films can be formed from the soluble green to transmissive films according to an embodiment of the invention.

In the above exemplary embodiments, the dioxyheterocyclic donor moieties are included in activated coupling reagents that react with halogenated compounds including acceptor moieties. In alternative embodiments, the acceptor moieties can be part of the activated coupling reagents and the dioxyheterocyclic donor compounds can have halide functionality for coupling into polymerizable units. For example, instead of being halogenated, the acceptor compounds described above can include a coupling group selected from the group consisting of organotin substituents (including any of the organotin groups described above), organoboron substituents, organomagnesium substituents, organozinc substituents, and organosilane substituents. Such coupling groups can be positioned, for example, to replace the two halogen functional groups of the above illustrated acceptor compounds. This acceptor compound can be coupled with a dioxyheterocycle based donor compounds, as described above, where a monohalogen group allows coupling to the difunctionalized acceptor compound described above.

The resulting polymers formed from the above described methods comprise a plurality of repeating units, which comprise at least two substituted dioxyheterocycle based donor group coupled to an acceptor group. Suitable examples of dioxyheterocyclic groups can be any of the dioxythiophene groups disclosed herein, as well as 3,4-alkylenedioxypyrrole, 3,4-alkylenedioxyfuran, 3,4-alkylenedioxyselenophene, 3,4-alkylenedioxytelurophene or other dioxypyrrole, dioxyfuran, dioxyselenophene, or dioxytelurophene groups. Suitable dioxyheterocyclic groups include those derived from the dioxyheterocylces disclosed in Reynolds et al., U.S. Pat. No. 6,791,738, Sep. 14, 2004. In one embodiment, the dioxyheterocycle groups employed to form the repeating units include 3,4-propylenedioxythiophenes. For example, the repeating units can have a general formula II:

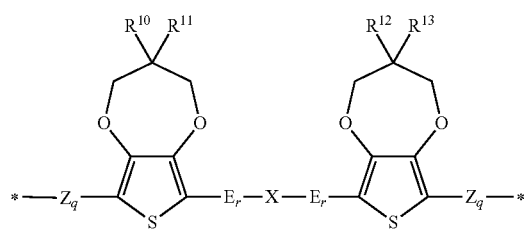

II where X can be chosen from any suitable electron poor acceptor group. The X groups can be substituted or unsubstituted benzothiadiazole groups, thiadiazoloquinoxaline groups, quinoxaline groups, thienothiadiazol groups, thienopyrazine groups, pyrazinoquinoxaline groups, benzobisthiadiazole groups or thiadiazolothienopyrazine groups. The E groups can be any suitable electron rich conjugated unit, and the Z groups can be chosen from any suitable conjugated unit. Suitable conjugated units for both E and Z include substituted or unsubstituted thiophene groups, alkylenedioxythiophene groups, such as substituted or unsubstituted ethylenedioxythiophene groups and propylenedioxythiophene groups, as well as any of the other dioxyheterocycle groups disclosed herein; q and r can be 0, 1 or 2; and $R^{10}$ to $R^{13}$ can be the same or different and can be chosen to be a linear or branched aliphatic carbon chain that can optionally comprise one or more heteroatoms (e.g., oxygen or nitrogen atoms) or functional groups chosen from oligoether groups, ester groups, amide groups, carboxylic acid groups, sulfonate groups, amine groups and other polar functional groups. In one embodiment, $R^{10}$, $R^{11}$, $R^{12}$ and $R^{13}$ can each be an —R'OR" group, where R' can be a methyl, ethyl or propyl and R" can be a linear or branched $C_2$ to $C_{30}$ alkyl, such as octyl or 2-ethylhexyl. In an embodiment, $R^{10}$, $R^{11}$, $R^{12}$ and $R^{13}$ can be chosen to be the same substituent.

In another embodiment of the invention, repeating units can have a general formula III:

$$*-Z_q-Y-E_r-X-E_r-Y-Z_q-*$$  III where X, E, Z, q and r are defined as above for formula I; and where Y is any suitable substituted dioxyheterocylce. For example Y can be a dioxythiophene, such as an alkylenedioxythiophene substituted with at least one linear or branched aliphatic carbon chain that optionally comprises one or more heteroatoms.

The X, E and Z groups of Formulae I and II can include any suitable substituents which can be positioned on any possible substituent site of the ring structures of these compounds. Examples of suitable substituents can include any of the $R^{10}$ to $R^{13}$ substituent groups disclosed herein. One of ordinary skill in the art would readily be able to determine suitable substituents and positioning of the substituents for these groups.

The number average molecular weight of the conjugated polymers of the present application can vary widely, depending on the particular repeating units employed, and the processing parameters used to form the polymers. Exemplary number average molecular weights can range from about 3000 g/mol to about 100,000 g/mol, as measured by gel permeation chromatography, although polymers having number average molecular weights outside of these ranges can also be formed.

MATERIALS AND METHODS

FIG. 1 characterizes the optical properties of polymers that were synthesized (6a, 6b, 9, 12) and their electroactivity upon electrochemical oxidation. As expected for a neutral state green polymer, all materials characterized showed two absorption bands in the visible region of the electromagnetic spectrum, including a first, moderately high absorption peak in the blue portion (below about 500 nm) and a second absorption peak that is generally higher than the first peak (indicating intense absorption) in the orange to red portion (above about 580 nm), with very little or no overlap in the green region (about 480 to about 580 nm), so that a minimum absorption point occurs between the first and second peaks in the green region. For all materials characterized, these two absorption bands bleached simultaneously upon oxidation and a new absorption band arises in the near infrared as charge carriers are formed (polarons and bi-polarons). In embodiments, the intense bleaching of the two p-p* transitions observed, as well as the quasi-absence of residual tail of the near infrared absorption bands into the visible, are observed and the polymer has a high transmissivity of the oxidized state. Taking the onset of absorption of the most intense absorption band as a reference for calculation, the optical energy gaps of these materials were found in the range 1.43-1.54 eV, and can therefore be considered to be "Narrow Band-Gap" polymers.

Figure 2:
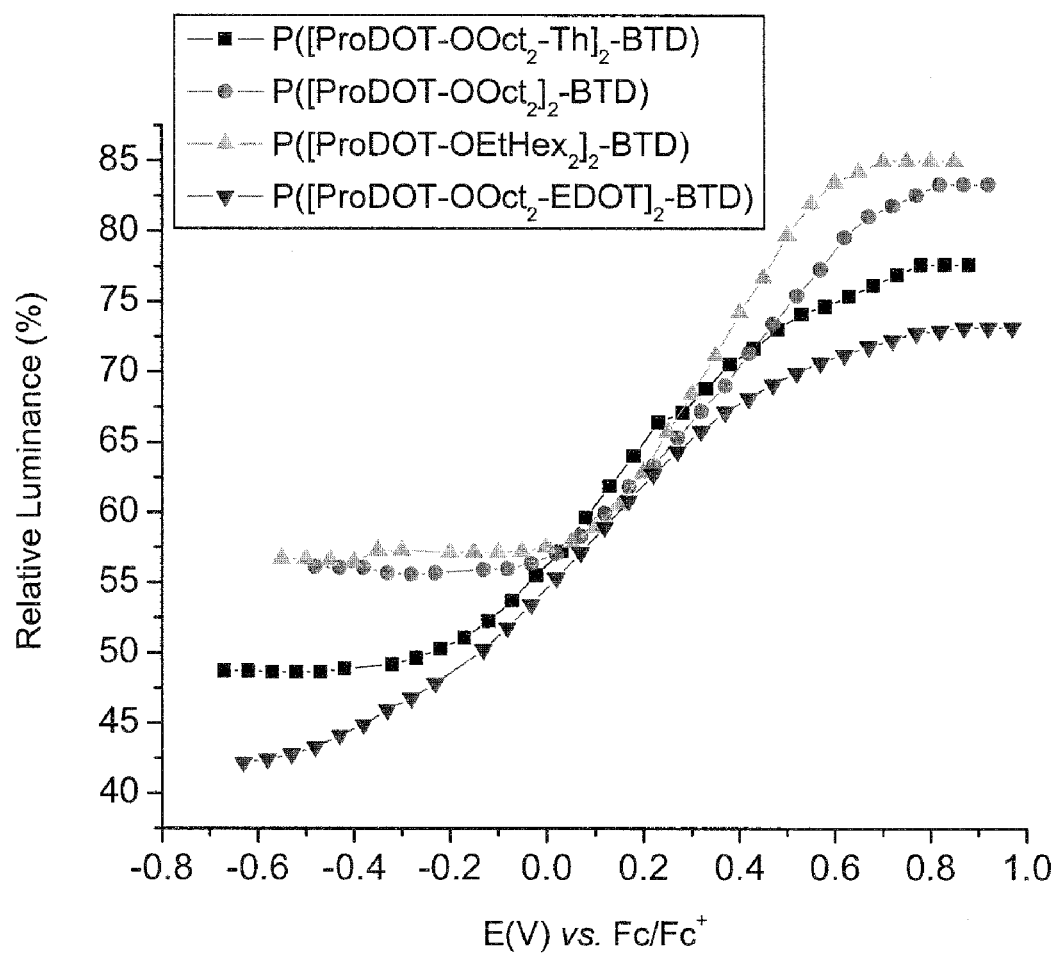
FIG. 2 shows relative luminance measured on thin films of Polymers 6a (P([ProDOT-$OOct_2]_2$-BTD)) (●), 6b (P([ProDOT-$OEtHex_2]_2$-BTD)) (▲), 9 (P([ProDOT-$OOct_2$-$Th]_2$-BTD)) (|) and 12 (P([ProDOT-$OOct_2$-$Th]_2$-BTD)) (▼). Experiments were carried out using solid thin films spray cast onto ITO from toluene (6a, 6b, 9) or chloroform (12).
Figure 3A:
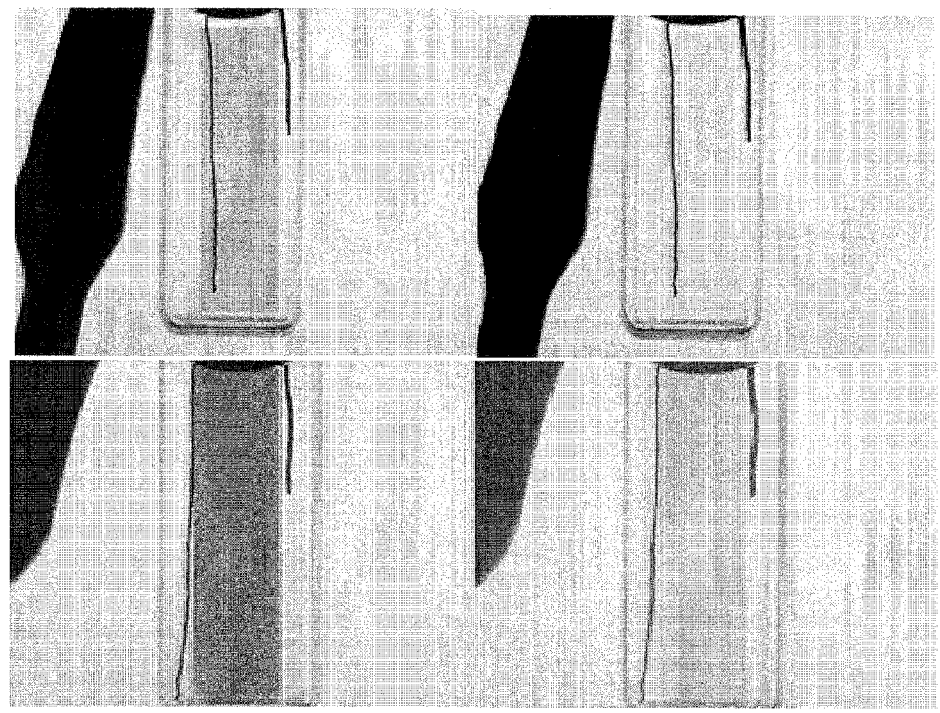
FIG. 3 shows photographs of the neutral and oxidized polymers (a) 6a (P([ProDOT-$OOct_2]_2$-BTD)), (b) 6b (P([ProDOT-$OEtHex_2]_2$-BTD)), (c) 9 (P([ProDOT-$OOct_2$-$Th]_2$-BTD)) and (d) 12 (P([ProDOT-$OOct_2$-$EDOT]_2$-BTD)) as solid thin or/and thick films spray cast onto ITO from Toluene (6a, 6b, 9) or Chloroform (12).
Figure 3B:
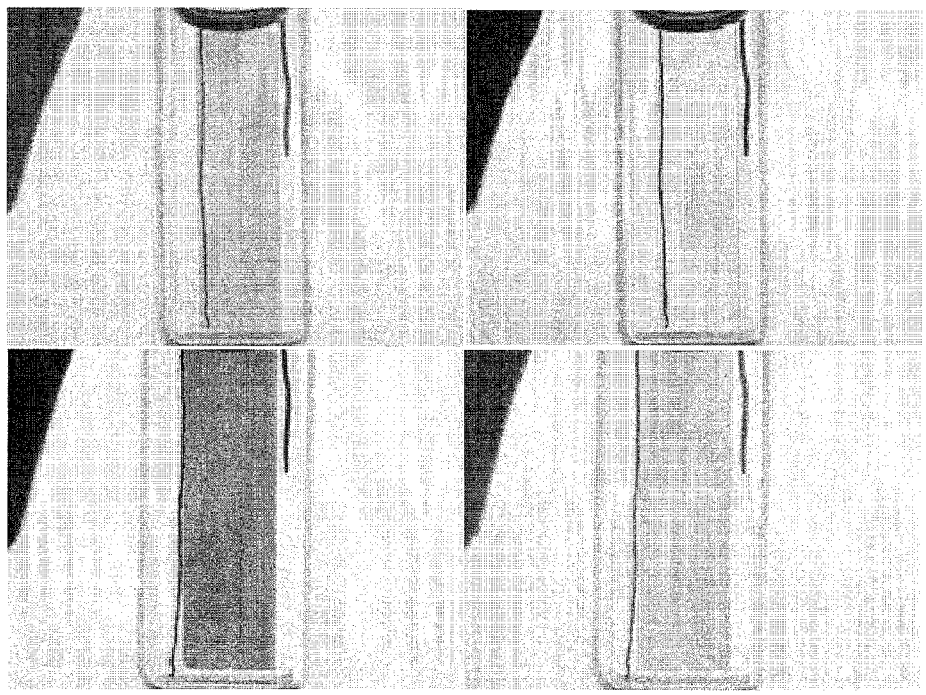
Figure 3C:
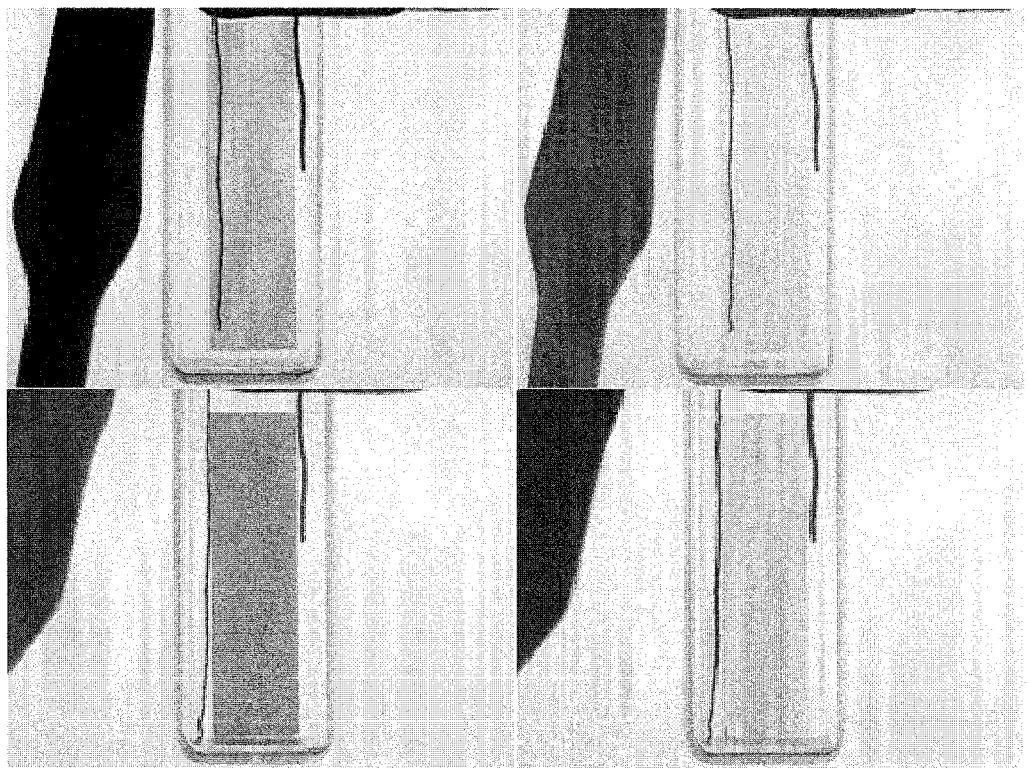
Figure 3D:
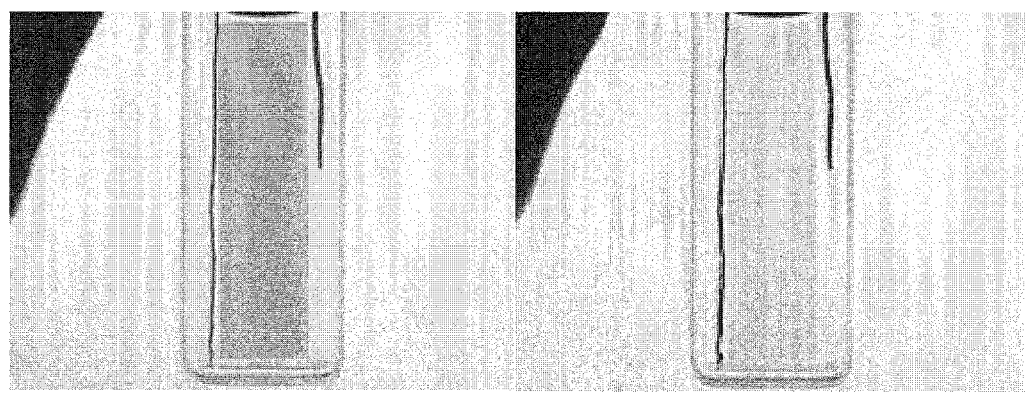

FIG. 2 shows the relative luminance measured under constant illumination from thin films of polymer that were spray cast onto ITO and submitted to progressive electrochemical oxidation. An average of 30% of optical change upon oxidation characterizes this family of polymers. While the relative luminance of polymer 12 reaches the moderate value of 73%, polymer 6b shows outstanding transmissivity upon oxidation with a relative luminance value reaching 84% in its fully oxidized state. The photographs reproduced in FIG. 3 illustrate this difference where all materials have been photographed in their neutral state (left) and in their fully oxidized state (right) as thin films (top) and/or thicker films (bottom). While polymers 6a and 6b reflect a rather "aquamarine" (blue-green or persian green) color in their neutral state, polymer 9 can be considered "pine green". The more red-shifted polymer 12 seems to offer a green certainly more "olive-like" (forest green) seemingly due to a residual dark-yellow reflection. Table 2 summarizes the color coordinates of all synthesized materials as well as the potentials at which the materials undergo optical changes. Examples of neutral state green colors that can be achieved using the conjugated polymers of the present application can include the range of colors defined by the CIELab color system having "L" values ranging from about 71 to about 80; "a" values ranging from about −15 to about −23; and "b" values ranging from about −11 to about 14, although green colors outside of this range can also be achieved.

TABLE 2

Colorimetric Results for the Neutral and Oxidized Polymers
6a (P([ProDOT-OOct$_2$]$_2$-BTD)), 6b (P([ProDOT-OEtHex$_2$]$_2$-BTD)),
9 (P([ProDOT-OOct$_2$-Th]$_2$-BTD)) and 12 (P([ProDOT-OOct$_2$-EDOT]$_2$-BTD)).

| Polymer Film | Charge State | E (V) | L | a | b | Observed Color |
| --- | --- | --- | --- | --- | --- | --- |
| P([ProDOT-OOct$_2$]$_2$-BTD) | N | 0 | 80 | −22 | −10 | Persian Green |
|  | O | 0.8 | 93 | −2 | 0 | Transmissive-Grey |
| P([ProDOT-OEtHex$_2$]$_2$-BTD) | N | −0.05 | 80 | −23 | −11 | Persian Green |
|  | O | 0.7 | 94 | −1 | 0 | Transmissive-Grey |
| P([ProDOT-OOct$_2$-Th]$_2$-BTD) | N | −0.35 | 75 | −15 | 1 | Pine Green |
|  | O | 0.75 | 91 | −3 | −3 | Transmissive-Clear Blue |
| P([ProDOT-OOct$_2$-EDOT]$_2$-BTD) | N | −0.6 | 71 | −19 | 14 | Forest Green |
|  | O | 0.8 | 89 | −5 | −5 | Transmissive-Clear Blue |

The conjugated polymers of the present disclosure can be employed in a variety of electronic devices. Suitable examples of such devices include electrochromic windows, mirrors and displays; SolarTurf, or artificial turfs that can harvest solar energy and generate electricity; Common Photovoltaic Devices; Electronic paper; Anti-Stat Conductors and Transparent Conductors; and Field Effect Transistors, supercapacitors, batteries, and other electronic components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A conjugated polymer comprising a plurality of repeating units, the repeating units comprising a plurality of substituted dioxyheterocycle based donor groups coupled to an acceptor group, wherein the acceptor group is an electron poor aromatic unit, wherein the conjugated polymer absorbs radiation within a first band of the visible spectrum having a maximum at a wavelength below 500 nm and a second band of the visible spectrum having a visible absorption maximum at a wavelength above 550 nm and a local minimum of absorption between 480 and 580 nm, when in a neutral state and upon oxidation the conjugated polymer is in a transmissive state with absorbance of radiation within the first and second bands being less than in the neutral state, wherein the polymer has a green hue when in the neutral state, and wherein the polymer exhibits solubility in at least one solvent.

2. The polymer of claim 1, wherein the solvent comprises methylene chloride, chloroform, tetrachloroethane, tetrahydrofuran, dioxane, benzene, toluene, xylenes, chlorobenzene, dichlorobenzene, pyridine, ethyl acetate, butanol, ethanol, methanol, acetonitrile, acetone, isopropanol, water or mixtures thereof.

3. The polymer of claim 1, wherein the conjugated polymer absorbs radiation within the first and second bands in the neutral state at an intensity of more than or equal to about 200% of the intensity in the transmissive state.

4. The polymer of claim 1, wherein the dioxyheterocycle is a dioxythiophene.

5. The polymer of claim 1, wherein the dioxyheterocycle is an alkylenedioxythiophene.

6. The polymer of claim 1, wherein the dioxyheterocycle is a 3,4-propylenedioxythiophene.

7. The polymer of claim 1, wherein the electron poor aromatic unit comprises a substituted or unsubstituted benzothiadiazole group, thiadiazoloquinoxaline group, quinoxaline group, thienothiadiazole group, thienopyrazine group, pyrazinoquinoxaline group, benzobisthiadiazole group or thiadiazolothienpyrazine group.

8. The polymer of claim 1, wherein the electron poor aromatic unit is a 2,1,3-benzothiadiazole group (BTD).

9. A conjugated polymer, comprising, a repeating unit of formula III:

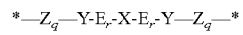     III, where X is an electron poor aromatic unit, E is an electron rich conjugated unit, Y is a substituted dioxyheterocycle, Z is a conjugated unit, and q and r are 0, 1, 2 or 3, wherein the conjugated polymer absorbs radiation within a first band of the visible spectrum having a maximum at a wavelength below 500 nm and a second band of the visible spectrum having a visible absorption maximum at a wavelength above 550 nm and a local minimum of absorption between 480 and 580 nm, when in a neutral state and upon oxidation the conjugated polymer is in a transmissive state with absorbance of radiation within the first and second bands being less than in the neutral state, wherein the polymer has a green hue when in the neutral state, and wherein the polymer exhibits solubility in at least one solvent.

10. The polymer of claim 9, wherein Y is a substituted dioxythiophene.

11. The polymer of claim 10, wherein the substituted dioxythiophene is an alkylenedioxythiophene substituted with at least one linear or branched aliphatic carbon chain that optionally comprises one or more heteroatoms.

12. The polymer of claim 2, wherein the repeating unit has a structure of formula II:

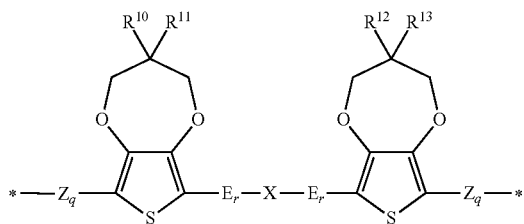

II where X is an electron poor aromatic unit, E is an electron rich conjugated unit, Z is a conjugated unit, q and r are 0, 1, 2 or 3, and $R^{10}$, $R^{11}$, $R^{12}$ and $R^{13}$ are the same or different and at least one of $R^{10}$, $R^{11}$, $R^{12}$ and $R^{13}$ comprises a linear or branched aliphatic carbon chain that optionally comprises one or more heteroatoms.

13. The polymer of claim 12, wherein X comprises a substituted or unsubstituted benzothiadiazole group, thiadiazoloquinoxaline group, quinoxaline group, thienothiadiazol group; thienopyrazine group, pyrazinoquinoxaline group, benzobisthiadiazole group and thiadiazolothienopyrazine group.

14. The polymer of claim 12, wherein E comprises a substituted or unsubstituted thiophene and Z comprises a substituted or unsubstituted dioxythiophene group.

15. The polymer of claim 12, wherein $R^{10}$, $R^{11}$, $R^{12}$ and $R^{13}$ comprise a functional group chosen from oligoether, ester, amide, carboxylic acid, sulfonate, and amine.

16. The polymer of claim 12, wherein $R^{10}$, $R^{11}$, $R^{12}$ and $R^{13}$ are —R'OR" groups, where R' is a methylene, ethylene or propylene group and R" is a linear or branched C2 to C30 alkyl.

17. A method of forming a conjugated polymer, the method comprising the steps of:
reacting two donor compounds comprising a substituted dioxyheterocyclic moiety with a conjugated acceptor compound comprising an acceptor moiety to form a polymerizable, wherein the acceptor moiety is an electron poor aromatic unit; and
linking covalently a plurality of the polymerizable units at ends of said polymerizable units to fol the conjugated polymer, wherein the conjugated polymer absorbs radiation within a first band of the visible spectrum and a second band of the visible spectrum when in a neutral state and upon oxidation the polymer is transmissive with absorbance of radiation within the first and second bands being less than in the neutral state, and wherein the polymer is soluble in at least one solvent.

18. The method of claim 17, wherein the step of reacting occurs in the presence of a metal catalyst.

19. The method of claim 17, wherein the ends of the polymerizable unit comprise dioxythiophene moieties.

20. The method of claim 17, wherein the dioxyheterocyclic moiety contains a coupling moiety comprising an organotin substituent, organoboron substituent, organomagnesium substituent, organozinc substituent, or organosilane substituent and the conjugated acceptor compound contains two halogen functional groups symmetrically situated on the conjugated acceptor compound.

21. The method of claim 17, wherein the conjugated acceptor compound has coupling moieties comprising two organotin substituents, organoboron substituents, organomagnesium substituents, organozinc substituents, or organosilane substituents symmetrically situated on the conjugated acceptor compound and the dioxyheterocycle moiety comprising a dioxythiophene moiety having a coupling moiety comprising a halogen.

22. The method of claim 17, wherein the conjugated acceptor compounds are chosen from dihalogenated benzothiadiazoles, dihalogenated thiadiazoloquinoxalines, dihalogenated quinoxalines, dihalogenated thienothiadiazoles, dihalogenated thienopyrazines, dihalogenated pyrazinoquinoxalines, dihalogenated benzobisthiadiazoles and dihalogenated thiadiazolothienpyrazines.

23. The method of claim 21, wherein the acceptor compounds are dibrominated 2,1,3-benzothiadiazoles.

24. The method of claim 17, wherein the donor compounds are chosen from compounds having a formula I:

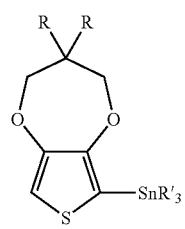

I where R groups are the same or different and comprise linear or branched aliphatic carbon chains and can optionally comprise one or more functional groups chosen from oligoether groups, ester groups, amide groups, carboxylic acid groups, sulfonate groups, amine groups and other polar functional groups and R' comprises an alkyl group.

25. The method of claim 24, wherein R is —R"OR'" group, where R" is a methylene, ethylene or propylene and R'" is a linear or branched C2 to C30 alkyl.

* * * * *

UNITED STATES PATENT AND TRADEMARK OFFICE
CERTIFICATE OF CORRECTION

PATENT NO. : 8,383,761 B2
APPLICATION NO. : 12/740570
DATED : February 26, 2013
INVENTOR(S) : Pierre Marc Beaujuge, John R. Reynolds and Stefan Martin Ellinger It is certified that error appears in the above-identified patent and that said Letters Patent is hereby corrected as shown below:

In the Specification

Column 5,
Line 47, "N,N-dimethylformiamide" should read -- N,N-dimethylformamide --.

In the Claims

Column 23,
Line 60, Claim 17, "units to fol the" should read -- units to form the --.

Signed and Sealed this
Twenty-seventh Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,383,761 B2  Page 1 of 1
APPLICATION NO. : 12/740570
DATED : February 26, 2013
INVENTOR(S) : Beaujuge et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 95 days.

Signed and Sealed this
First Day of September, 2015

Michelle K. Lee
*Director of the United States Patent and Trademark Office*